(12) United States Patent
Sjöberg

(10) Patent No.: US 7,770,604 B2
(45) Date of Patent: Aug. 10, 2010

(54) HOLLOW PROFILE USED IN THE MANUFACTURE OF A PIPE

(75) Inventor: Sven Sjöberg, Vasa (FI)

(73) Assignee: Oy KWH Pipe Ab, Vasa (FI)

( * ) Notice: Subject to any disclaimer, the term of this patent is extended or adjusted under 35 U.S.C. 154(b) by 199 days.

(21) Appl. No.: 10/546,597

(22) PCT Filed: Feb. 23, 2004

(86) PCT No.: PCT/FI2004/000078

§ 371 (c)(1),
(2), (4) Date: May 1, 2006

(87) PCT Pub. No.: WO2004/076903

PCT Pub. Date: Sep. 10, 2004

(65) Prior Publication Data

US 2006/0225804 A1 Oct. 12, 2006

(30) Foreign Application Priority Data

Feb. 25, 2003 (FI) ................................. 20030275

(51) Int. Cl.
*F16L 9/00* (2006.01)
(52) U.S. Cl. ................. 138/177; 138/129; 138/DIG. 11
(58) Field of Classification Search ................. 138/177, 138/178, DIG. 11, 129
See application file for complete search history.

(56) References Cited

U.S. PATENT DOCUMENTS

| | | | | |
|---|---|---|---|---|
| 296,027 A | * | 4/1884 | Mark | ........................ 403/308 |
| 1,859,259 A | * | 5/1932 | Chamberlain et al. | ..... 285/133.4 |
| 1,928,009 A | * | 9/1933 | Dornier | ...................... 138/177 |
| 1,960,557 A | * | 5/1934 | Snyder | ........................ 285/179 |
| 3,451,434 A | * | 6/1969 | Bauer, Jr. | ..................... 138/172 |
| 3,603,905 A | * | 9/1971 | Schuttloffel | ................. 333/241 |
| 3,917,500 A | | 11/1975 | Petzetakis et al. | |
| 3,941,157 A | * | 3/1976 | Barnett | ........................ 138/115 |
| 4,729,409 A | * | 3/1988 | Paul | ............................ 138/115 |
| 5,431,762 A | | 7/1995 | Blomqvist | |
| 5,996,645 A | * | 12/1999 | Hosokawa et al. | .......... 138/177 |
| 6,105,649 A | | 8/2000 | Levingston et al. | |

FOREIGN PATENT DOCUMENTS

| | | |
|---|---|---|
| GB | 1178685 | 1/1970 |
| JP | 8192472 A | 7/1996 |

\* cited by examiner

*Primary Examiner*—Patrick F Brinson
(74) *Attorney, Agent, or Firm*—Connolly Bove Lodge & Hutz LLP

(57) ABSTRACT

This invention relates to a hollow profile (1) used for the manufacture of a spirally wound double-walled thermoplastic pipe, which hollow profile has essentially a rectangular cross section and the wall (2) of the hollow profile intended to form the inner wall of the pipe is thicker than the wall (4) intended to form the outer wall (4) of the pipe. The invention is characterized in that the inner rounding radius (7*a*) of the edges adjacent to the thicker wall (2) of the hollow profile is considerably larger than the rounding radius (7) of the two other edges of the cavity (6).

12 Claims, 1 Drawing Sheet

HOLLOW PROFILE USED IN THE MANUFACTURE OF A PIPE

Figure 1:
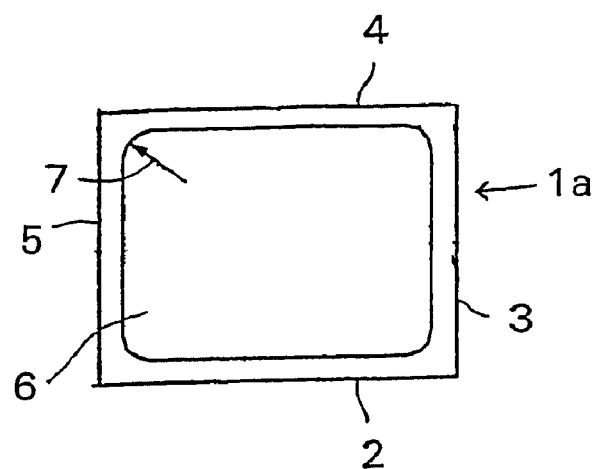

The invention relates to a hollow profile used in the manufacture of a spirally wound double-walled thermoplastic pipe, which hollow profile has essentially a rectangular cross section, and the wall of the hollow profile intended to form the inner wall of the pipe is thicker than the wall intended to form the outer wall of the pipe.

In manufacturing spirally wound double-walled thermoplastic pipes, a hollow profile is spirally wound around a drum, or the like, corresponding to the inner diameter of a pipe, and adjacent loops of the hollow profile are welded together in a manner known as such. The advantage of a pipe manufactured in such a manner is its lightness and good ring stiffness compared to solid pipes manufactured using the same amount of material. At the same time the double-walled structure gives to the pipe a good insulating property and a heating or cooling fluid can be flown through the spirally extending cavity in the pipe wall.

The cavity of a hollow profile used in the manufacture of a conventional spirally wound pipe has essentially a rectangular cross section, whereby all edges of the rectangle are rounded with a rounding radius of the same size, and each wall of the hollow profile has approximately the same thickness. The wall structure of these pipes, which are primarily intended for pressureless transport of fluids, is optimized to resist outer loads such as earth load, ground water and traffic load, but they are not intended to be used in applications wherein the internal pressure in the pipe is raised. A raised inner pressure may namely damage the wall of the pipe.

The object of the present invention is to provide a hollow profile structure, which considerably improves the ability of a pipe to resist internal pressure. This object is achieved by means of a hollow profile, which is characterized in that the inner rounding radius of the edges adjacent to the thicker wall of the hollow profile is considerably larger than the rounding radius of the two other edges of the cavity.

In an advantageous embodiment, the thickness of the wall of a hollow profile, which is intended to form the inner wall of a pipe, is smallest in the middle section of this wall and it is progressively growing towards the two hollow profile side edges adjacent to this wall. The three other walls of the hollow profile have preferably a thickness equal to each other.

The ratio of the minimum thickness of the thicker wall to the thickness of the other walls of a hollow profile intended for the manufacture of a pipe having an inner diameter of 1200 mm is preferably 120:77 and the inner rounding radius of the edges adjacent to the thicker wall is preferably 24 mm.

As a material for the hollow profile, an extrudable thermoplastic, such as polyolefin, preferably HD-polyethylene or polypropylene, can be used. By modifying the thermoplastic with fillers and/or reinforcing agents, improved pressure resistant properties in combination with improved ring stiffness properties are achieved.

Figure 2:
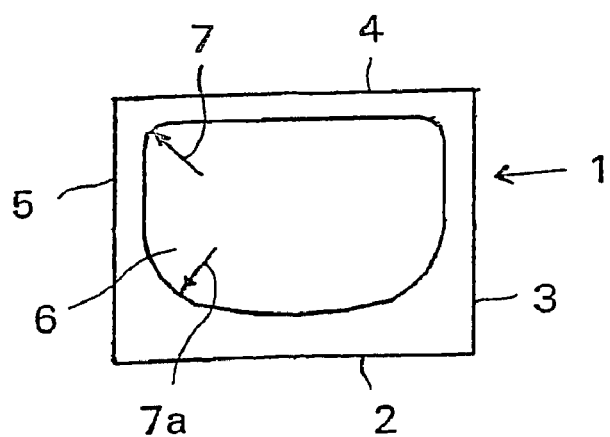

In the following the invention is described with reference to the enclosed figures wherein FIG. 1 shows a cross section of a conventional hollow profile used in the manufacture of a spirally wound pipe, and FIG. 2 shows a cross section of a hollow profile according to the invention used in the manufacture of a spirally wound pipe.

FIG. 1 shows a cross section of a conventional rectangular hollow profile 1a, which has been used for the manufacture of a spirally wound double-walled thermoplastic pipe, which transports an unpressured fluid. As can be seen from the figure, all walls 2, 3, 4, 5 of the profile have approximately the same thickness, and all edges of its hollow space 6 have been rounded with the same rounding radius. For example for the manufacture of a spirally wound sloping pipe of an inner diameter of 1200 mm, a hollow profile 1a of this type can be used, the outer width of the cross section of which is 93.8 mm and the outer height is 75 mm. Each edge of the hollow space 6 of the hollow profile 1a has a rounding radius of 6.7 mm, and the wall 2 of the hollow profile, which is intended to form the inner wall of a spirally wound pipe, has a thickness of 6.5 mm and the other walls 3, 4, 5 of the hollow profile have a thickness of 5.6 mm. A spirally wound pipe manufactured with a hollow profile of this kind is suitable for the transport of an unpressurized medium, such as a fluid, but it is not suitable for the transport of pressurized mediums, whereby a greater internal pressure is generated in a pipe.

A hollow profile 1 according to the invention enables the manufacture of a spirally wound pipe, which considerably better resist an internal pressure. FIG. 2 shows a cross section of an advantageous embodiment of the hollow profile 1 according to the invention. This hollow profile 1 has the same outer dimensions as the hollow profile 1a shown in FIG. 1 for the manufacture of a spirally wound pipe having an inner diameter of the same size. The wall 2 of the hollow profile according to the invention, which is intended to form the inner wall of a spirally wound pipe, has an essentially larger thickness compared to the other walls 3, 4, 5 of the hollow profile, while a rounding radius 7a of the edges of the hollow space 6 adjacent to the wall 2 is considerably larger than the rounding radius of the two other edges, which latter radius is the same as all rounding radii of the hollow profile shown in FIG. 1. According to the advantageous embodiment shown in FIG. 2, the thickness of the wall 2 is not constant over its whole width, but the thickness is smallest in the middle section of the wall 2 and it is progressively growing towards the two edges of the hollow profile adjacent to this wall 2 so that the cavity of the hollow profile 1 has approximately an arc-shaped cross section at this thickened wall 2. For the manufacture of a spirally wound pipe of an inner diameter of 1200 mm, the minimum thickness of the thickened wall 2 can be 12 mm, while the other walls 3, 4 and 5 of the hollow profile 1 have a thickness of 7.7 mm. The rounding radius 7a at the edges of the hollow space 6 adjacent to the wall 2 is at its smallest 24 mm.

For the comparison of the hollow profiles 1a and 1 shown in FIGS. 1 and 2, we have tested internal tensions occurring in the inner walls of spirally wound pipes having an inner diameter of 1200 mm manufactured of said both hollow profiles, while a pressure prevailing in the pipe is 2 bar. Performed comparison calculations gave the result that the maximum tension in the inner wall of a pipe manufactured from the hollow profile of FIG. 1 was 8 N/mm², and the maximum tension in the inner wall of a pipe manufactured from the hollow profile of FIG. 2 was only approximately 4 N/mm². As will appear from the results, a considerable improvement with respect to the pressure resistance property of a pipe is achieved by means of the hollow profile according to the invention.

The invention claimed is:

1. A spirally wound double-walled thermoplastic pipe consisting essentially of a hollow profile, which hollow profile has essentially a rectangular cross section, has a wall that forms an inner wall of said pipe and three other walls that form an outer wall of said pipe, and wherein the wall of the hollow profile that forms the inner wall of the pipe is thicker than the walls of the hollow profile that form the outer wall of the pipe, wherein an inner rounding radius of two edges adjacent to the thicker wall of the hollow profile is considerably larger than an inner rounding radius of the two other edges of the hollow profile, and wherein the pipe is made of an extrudable thermoplastic.

2. The pipe according to claim 1, wherein the thickness of the wall of the hollow profile, which forms the inner wall of the pipe, is smallest in the middle portion of this wall and is progressively growing towards the two side edges of the hollow profile locating adjacently to this wall.

3. The pipe according to claim 2, wherein the three other walls of the hollow profile have a thickness equal to each other.

4. The pipe according to claim 3, wherein the ratio of the minimum thickness of the thicker wall to the thickness of the other walls of the hollow profile of the pipe having an inner diameter of 1200 mm is 120:77 and the inner rounding radius of the edges adjacent to the thicker wall is 24 mm.

5. The pipe according to claim 1, wherein the thermoplastic is modified with fillers and/or reinforcing agents for further improving pressure resistance and ring stiffness properties.

6. The pipe according to claim 1, wherein the thermoplastic is polyolefin, PE-HD or polypropylene.

7. The pipe according to claim 2, wherein the thermoplastic is polyolefin, PE-HD or polypropylene.

8. The pipe according to claim 2, wherein the thermoplastic is modified with fillers and/or reinforcing agents for further improving pressure resistance and ring stiffness properties.

9. The pipe according to claim 3, wherein the thermoplastic is polyolefin, PE-HD or polypropylene.

10. The pipe according to claim 3, wherein the thermoplastic is modified with fillers and/or reinforcing agents for further improving pressure resistance and ring stiffness properties.

11. The pipe according to claim 4, wherein the thermoplastic is polyolefin, PE-HD or polypropylene.

12. The pipe according to claim 4, wherein the thermoplastic is modified with fillers and/or reinforcing agents for further improving pressure resistance and ring stiffness properties.

* * * * *